United States Patent
Kim et al.

(10) Patent No.: US 11,523,458 B2
(45) Date of Patent: Dec. 6, 2022

(54) METHOD AND APPARATUS FOR DISCONTINUOUS RECEPTION OF CONNECTED TERMINAL IN A MOBILE COMMUNICATION SYSTEM

(71) Applicant: Samsung Electronics Co., Ltd., Gyeonggi-do (KR)

(72) Inventors: Soeng-Hun Kim, Gyeonggi-do (KR); No-Jun Kwak, Seoul (KR); Gert-Jan Van Lieshout, Middlesex (GB); Himke Van Der Velde, Middlesex (GB)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/173,608

(22) Filed: Feb. 11, 2021

(65) Prior Publication Data

US 2021/0168899 A1 Jun. 3, 2021

Related U.S. Application Data

(63) Continuation of application No. 16/676,000, filed on Nov. 6, 2019, now Pat. No. 10,925,110, which is a
(Continued)

(30) Foreign Application Priority Data

| Mar. 28, 2006 | (KR) | 10-2006-0027986 |
| Sep. 6, 2006 | (KR) | 10-2006-0085757 |

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0216* (2013.01); *H04W 52/0235* (2013.01);
(Continued)

(58) Field of Classification Search
CPC ............ H04W 76/28; H04W 52/0216; H04W 52/0235; H04W 72/042; H04W 72/0446; H04L 1/16; Y02D 30/70
(Continued)

(56) References Cited

U.S. PATENT DOCUMENTS

| 5,815,819 A | 9/1998 | Ohta et al. |
| 5,881,055 A | 3/1999 | Kondo |

(Continued)

FOREIGN PATENT DOCUMENTS

| CN | 1215534 | 4/1999 |
| CN | 1281319 | 7/2000 |

(Continued)

OTHER PUBLICATIONS

Don Libes, "Implementing Software Timers", www.kohala.com/start/libes.timers.txt, Dec. 1, 2020, 7 pages.
(Continued)

*Primary Examiner* — Inder P Mehra
(74) *Attorney, Agent, or Firm* — The Farrell Law Firm, P.C.

(57) ABSTRACT

A method and apparatus are provided for controlling an active state in a mobile communication system. The method includes receiving, from a base station, information related to a starting position of an active state and information related to a length of a first timer; deriving the starting position of the active state based on the information related to the starting position; starting the first timer set to the length of the first timer and entering the active state at the derived starting position; terminating the active state if control data indicating a transmission of user data is not received until the first timer expires; extending a period of the active state if the control data is received before the first
(Continued)

timer expires; and terminating the active state based on a control signal indicating a termination of the active state.

20 Claims, 10 Drawing Sheets

Related U.S. Application Data continuation of application No. 16/273,854, filed on Feb. 12, 2019, now Pat. No. 10,849,184, which is a continuation of application No. 15/621,266, filed on Jun. 13, 2017, now Pat. No. 10,206,245, which is a continuation of application No. 14/750,383, filed on Jun. 25, 2015, now Pat. No. 9,681,488, which is a continuation of application No. 13/909,605, filed on Jun. 4, 2013, now Pat. No. 9,094,914, which is a continuation of application No. 13/608,590, filed on Sep. 10, 2012, now Pat. No. 8,457,588, which is a continuation of application No. 11/729,032, filed on Mar. 28, 2007, now Pat. No. 8,270,932.

(51) Int. Cl.
*H04W 72/04* (2009.01)
*H04L 1/16* (2006.01)

(52) U.S. Cl.
CPC ..... *H04W 72/042* (2013.01); *H04W 72/0446* (2013.01); *H04L 1/16* (2013.01); *Y02D 30/70* (2020.08)

(58) Field of Classification Search
USPC .......................................................... 370/311
See application file for complete search history.

(56) References Cited

U.S. PATENT DOCUMENTS

| | | | |
|---|---|---|---|
| 6,016,312 A | 1/2000 | Storm et al. | |
| 6,157,845 A | 12/2000 | Henry | |
| 6,243,579 B1 | 6/2001 | Kari | |
| 6,289,228 B1 | 9/2001 | Rotstein et al. | |
| 6,871,074 B2 | 3/2005 | Harris et al. | |
| 6,919,643 B2 | 7/2005 | Wheeler et al. | |
| 7,499,424 B2 | 3/2009 | Cho et al. | |
| 7,903,689 B2 | 3/2011 | Niinomi et al. | |
| 8,070,902 B2 | 12/2011 | Ryu | |
| 8,270,932 B2* | 9/2012 | Kim | H04W 52/0216 455/343.2 |
| 8,457,588 B2* | 6/2013 | Kim | H04W 72/042 455/343.2 |
| 8,463,313 B2 | 6/2013 | Love et al. | |
| 9,094,914 B2* | 7/2015 | Kim | H04W 72/042 |
| 9,681,488 B2* | 6/2017 | Kim | H04W 76/28 |
| 10,206,245 B2* | 2/2019 | Kim | H04W 72/042 |
| 10,849,184 B2* | 11/2020 | Kim | H04W 52/0235 |
| 10,925,110 B2* | 2/2021 | Kim | H04W 72/0446 |
| 2002/0064140 A1 | 5/2002 | Numminen | |
| 2002/0086720 A1 | 7/2002 | Kim | |
| 2002/0106997 A1* | 8/2002 | Barber | H04W 52/0229 455/343.1 |
| 2002/0141331 A1 | 10/2002 | Mate et al. | |
| 2003/0043742 A1 | 3/2003 | De Maria | |
| 2004/0073933 A1 | 4/2004 | Gollnick et al. | |
| 2004/0100940 A1* | 5/2004 | Kuure | H04W 68/02 370/349 |
| 2004/0127206 A1 | 7/2004 | Van Bosch et al. | |
| 2004/0127221 A1* | 7/2004 | Takano | H04W 88/08 455/445 |
| 2004/0185918 A1 | 9/2004 | Fan et al. | |
| 2004/0198383 A1* | 10/2004 | Choi | H04W 80/04 455/456.1 |
| 2004/0221185 A1 | 11/2004 | Bose et al. | |
| 2004/0229605 A1 | 11/2004 | Hwang et al. | |
| 2004/0252660 A1 | 12/2004 | Ahmavaara | |
| 2005/0002414 A1 | 1/2005 | Miyaoka | |
| 2005/0032551 A1 | 2/2005 | Lee et al. | |
| 2005/0032555 A1 | 2/2005 | Jami et al. | |
| 2005/0063304 A1 | 3/2005 | Sillasto et al. | |
| 2005/0085279 A1 | 4/2005 | Aoki | |
| 2005/0122960 A1 | 6/2005 | Khan | |
| 2005/0232271 A1 | 10/2005 | Kettunen et al. | |
| 2006/0062237 A1 | 3/2006 | Kim | |
| 2006/0166688 A1 | 7/2006 | Sun et al. | |
| 2006/0227743 A1 | 10/2006 | Ishimori et al. | |
| 2007/0053323 A1 | 3/2007 | Imaizumi et al. | |
| 2007/0160027 A1 | 7/2007 | Muqattash et al. | |
| 2007/0178875 A1 | 8/2007 | Rao et al. | |
| 2007/0183355 A1* | 8/2007 | Kuchibhotla | H04W 52/0245 370/318 |
| 2008/0056198 A1 | 3/2008 | Charpentier et al. | |
| 2008/0309490 A1 | 12/2008 | Honkanen et al. | |
| 2009/0067367 A1 | 3/2009 | Buracchini | |
| 2009/0156215 A1 | 6/2009 | Pitkamaki | |
| 2009/0175186 A1 | 7/2009 | Du | |
| 2009/0221242 A1 | 9/2009 | Bergstrom et al. | |
| 2009/0305711 A1 | 12/2009 | Rinne et al. | |
| 2011/0134787 A1 | 6/2011 | Hirano et al. | |
| 2012/0100896 A1 | 4/2012 | Aoyama et al. | |
| 2016/0165640 A1 | 6/2016 | Yang | |
| 2016/0182175 A1 | 6/2016 | Landau | |

FOREIGN PATENT DOCUMENTS

| | | |
|---|---|---|
| CN | 1364039 | 12/2001 |
| CN | 1708923 | 12/2005 |
| EP | 1 193 985 | 4/2002 |
| EP | 1 499 144 | 1/2005 |
| GB | 2406751 | 4/2005 |
| JP | 9139708 | 5/1997 |
| JP | 2002262333 | 9/2002 |
| JP | 2005-057787 | 3/2005 |
| JP | 2005130436 | 5/2005 |
| JP | 2005-184824 | 7/2005 |
| JP | 2005354196 | 12/2005 |
| JP | 2006005878 | 1/2006 |
| JP | 2006522560 | 9/2006 |
| JP | 2007535884 | 12/2007 |
| KR | 1020010171869 | 7/2001 |
| KR | 1020040053309 | 6/2004 |
| KR | 1020050016053 | 2/2005 |
| RU | 2195075 | 2/1998 |
| RU | 2003125333 | 2/2005 |
| WO | WO 2004/088927 | 10/2004 |
| WO | WO 2004/091130 | 10/2004 |
| WO | WO 2005/039128 | 4/2005 |
| WO | WO 2005/109690 | 11/2005 |

OTHER PUBLICATIONS

Ericsson, "MAC Procedures for DRX and DTX in LTE_Active", R2-060591, TSG-RAN WGx Meeting #51, Feb. 13-17, 2006, 4 pages.
Huawei, "Power-saving Mode Discussion in LTE_ACTIVE State", R2-060856, 3GPP TSG RAN2 #52, Mar. 27-31, 2006, 2 pages.
NTT DoCoMo et al., "L1/L2 Control Channel Structure for E-UTRA Downlink", R1-060776, 3GPP TSG-RAN WG1 Meeting #44bis, Mar. 27-31, 2006, 9 pages.
Request for Trial Granted dated Mar. 15, 2018 issued in counterpart application No. 8,457,588, 54 pages.
Indian Examination Report dated Nov. 29, 2019 issued in counterpart application No. 1768/MUMNP/2014, 5 pages.
U.S. Office Action dated Feb. 20, 2020 issued in counterpart U.S. Appl. No. 16/273,854, 12 pages.
Chinese Office Action dated Jan. 15, 2016 issued in counterpart application No. 201310189055.7, 14 pages.

(56) References Cited

OTHER PUBLICATIONS

Chinese Office Action dated Aug. 24, 2015 issued in counterpart application No. 201310194929.8, 12 pages.

* cited by examiner

METHOD AND APPARATUS FOR DISCONTINUOUS RECEPTION OF CONNECTED TERMINAL IN A MOBILE COMMUNICATION SYSTEM

PRIORITY

This application is a Continuation of U.S. application Ser. No. 16/676,000, which was filed in the U.S. Patent and Trademark Office (USPTO) on Nov. 6, 2019, which is a Continuation of U.S. application Ser. No. 16/273,854, which was filed in the USPTO on Feb. 12, 2019, and issued as U.S. Pat. No. 10,849,184 on Nov. 24, 2020, which is a Continuation of U.S. application Ser. No. 15/621,266, which was filed in the USPTO on Jun. 13, 2017, and issued as U.S. Pat. No. 10,206,245 on Feb. 12, 2019, which is a Continuation of U.S. application Ser. No. 14/750,383, which was filed in the USPTO on Jun. 25, 2015, and issued as U.S. Pat. No. 9,681,488 on Jun. 13, 2017, which is a Continuation of U.S. application Ser. No. 13/909,605, which was filed in the USPTO on Jun. 4, 2013, and issued as U.S. Pat. No. 9,094,914 on Jul. 28, 2015, which is a Continuation of U.S. application Ser. No. 13/608,590, which was filed in the USPTO on Sep. 10, 2012, and issued as U.S. Pat. No. 8,457,588 on Jun. 4, 2013, which is a Continuation of U.S. application Ser. No. 11/729,032, which was filed in the USPTO on Mar. 28, 2007, and issued as U.S. Pat. No. 8,270,932 on Sep. 18, 2012, and claims priority under 35 U.S.C. § 119(a) to Korean Patent Applications filed in the Korean Intellectual Property Office on Mar. 28, 2006 and on Sep. 6, 2006, which were assigned Serial Nos. 10-2006-0027986 and 10-2006-0085757, respectively, the entire disclosure of each of which is incorporated herein by reference.

BACKGROUND OF THE INVENTION

1. Field of the Invention

The present invention generally relates to a Discontinuous Reception (DRX) operation in a mobile communication system. More particularly, the present invention relates to a method and apparatus for performing a DRX operation using a variable active period in a connected terminal.

2. Description of the Related Art

The wireless communication system was in large measure designed because a communication device has no access to the fixed wired network. Such wireless communication systems include mobile communication systems, Wireless Local Area Network (WLAN), Wireless Broadband (Wi-Bro), and mobile ad hoc systems.

In particular, mobile communication systems are based on user mobility, compared to other wireless communication systems. They ultimately aim to provide communication services to mobile terminals such as portable phone and wireless pagers irrespective of time and location.

Mobile communication systems operate synchronously or asynchronously. Particularly, Universal Mobile Telecommunication Service (UMTS) is a $3^{rd}$ Generation (3G) asynchronous mobile communication system operating in Wideband Code Division Multiple Access (WCDMA), based on the European mobile communication systems, Global System for Mobile Communications (GSM) and General Packet Radio Services (GPRS). The $3^{rd}$ Generation Partnership Project (3GPP) working on UMST standardization is now discussing the future-generation UMTS system called Long Term Evolution (LTE).

LTE is a technology for high-speed packet communications at or above 100 Mbps, seeking commercialization around 2010. To do so, many schemes are under study, for example, a method for reducing the number of nodes existing on a communication path by simplifying the network configuration or the method for approximating wireless protocols to radio channels as close as possible. Eventually, the LTE system will be changed from the existing 4-node architecture to a 2-node or 3-node architecture.

FIG. 1 illustrates the configuration of an LTE system to which the present invention applies.

Referring to FIG. 1, the LTE system can be simplified to a 2-node architecture with Evolved Node Bs (ENBs) 100a to 100e and Evolved Gateway GPRS Serving Nodes (EGG-SNs) 102a and 102b.

ENBs 100a to 100e, which are equivalent to existing Node Bs, are connected to a User Equipment (UE) 104 by a radio channel. Compared to the conventional Node Bs, ENBs 100a to 100e provide more complex functionalities. This implies that all user traffics including real-time service such as Voice over Internet Protocol (VoIP) are serviced on shared channels and thus a device for collecting status information of the particular UE 104 and other UEs and scheduling them is required in the LTE system. ENBs 100a to 100e are responsible for the scheduling.

To achieve data rates of up to 100 Mbps, the LTE system is expected to use a wireless access technology called Orthogonal Frequency Division Multiplexing (OFDM) in a 20-MHz bandwidth. Adaptive Modulation and Coding (AMC) will be applied to UE 104 according to its channel status. That is, a modulation scheme and a channel coding rate are adaptively selected for UE 104 according to the channel status.

Like High Speed Downlink Access (HSDPA) or Enhanced uplink Dedicated Channel (E-DCH), the LTE system will use Hybrid Automatic Repeat reQuest (HARQ) between UE 104 and ENBs 100a to 100e. HARQ is a scheme for increasing the reception success rate by soft-combining initial transmission data with retransmission data without deleting the former data. Thus, UE 104 intends to ensure the reception performance of packets by the AMC and HARQ schemes.

Conventionally, a UE wakes up at a predetermined time, monitors a predetermined channel for a predetermined time period, and then enters again into a sleep mode in an idle state. This is called Discontinuous Reception Operation (DRX), which is a way to lengthening the waiting time of the idle-state UE.

FIG. 2 illustrates the timing of DRX operation in a conventional mobile communication system.

Referring to FIG. 2, a UE and a Node B agree on a DRX configuration, the sleep period and an alternate active period according to the DRX configuration. The sleep period is a time period during which the UE turns off its receiver, thus minimizing power consumption. The active period is a time period during which the UE performs a normal reception operation with its receiver turned on. The active period is also called a wake-up period and thus the terms "active period" and "wake-up period" are interchangeably used in the same meaning herein.

The DRX configuration is typically composed of the following elements.

1. DRX cycle length 210 or 220: the interval between an active period and the next active period. With the DRX cycle length, the sleep mode is increased, and the power consumption of the UE is decreased. Yet, the increased DRX cycle length increases the paging delay in the UE. A network signals the DRX cycle length.

2. Starting position of an active period 205, 215 or 225: The starting position of an active period is derived from the Identifier (ID) of the UE and the DRX cycle length. For example, the starting position of the active period is calculated by modulo operation of the UE ID and the DRX cycle length.

3. Active period length 235: a timer period during which the UE is kept awake in one active period. Typically, the active period length is preset. For example, the active period length is 10 msec in the UMTS communication system.

The UE calculates the starting position 230 of an active period using the UE ID and the DRX cycle length 210 or 220 and receives a downlink channel for the active period counted from the starting position 230. In the absence of desired information on the downlink channel, the UE turns off its receiver and enters into a sleep period.

The classic DRX operation of waking up at every predetermined time interval and monitoring the downlink channel for a predetermined time period illustrated in FIG. 2 is not feasible for a connected UE in the novel LTE system.

When the UE is connected, it means that a particular service is in progress for the UE and user data associated with the service exists between the network and the UE. The network, capable of Radio Link Control (RRL), preserves the service context for the UE. The UE in this state is called a connected UE.

Accordingly, there exists a need for specifying a DRX operation of a connected UE in the LTE system, in relation to the conventional DRX operation of an idle-state UE.

SUMMARY OF THE INVENTION

An aspect of the present invention is to address at least the above problems and/or disadvantages and to provide at least the advantages described below.

Accordingly, an aspect of the present invention is to provide a method and apparatus for a connected UE in a mobile communication system to perform a DRX operation.

Another aspect of the present invention provides a method and apparatus for setting a DRX cycle variable, taking into account the amount of packet data in a UE in a future-generation mobile communication system.

A further aspect of the present invention provides a method and apparatus for adjusting the active period length for a UE.

In accordance with an aspect of the present invention, a method is provided for controlling an active state in a mobile communication system. The method includes receiving, from a base station, information related to a starting position of an active state and information related to a length of a first timer; deriving the starting position of the active state based on the information related to the starting position; starting the first timer set to the length of the first timer and entering the active state at the derived starting position; terminating the active state if control data indicating a transmission of user data is not received until the first timer expires; extending a period of the active state if the control data is received before the first timer expires; and terminating the active state based on a control signal indicating a termination of the active state.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

The matters defined in the description such as detailed construction and elements are provided to assist in a comprehensive understanding of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

While exemplary embodiments of the present invention are described in the context of an LTE system, it is to be understood that they are applicable to other mobile communication systems using DRX without modification.

The exemplary embodiments of the present invention define a DRX operation for a connected UE in a future-generation mobile communication system. Preferably but not necessarily, the DRX of the connected UE is configured, taking into account service characteristics. A different amount of data may be generated for the connected UE every DRX_cycle depending on service type. In other words, the duration for which the UE monitors the downlink channel needs to be changed in each DRX cycle according to the amount of data to be sent during the DRX cycle.

For example, when the UE receives a file download service using Transmission Control Protocol (TCP), in view of the nature of TCP, one packet is initially sent on the downlink, two packets are sent in response to a TCP ACK from the UE, and then four packets are sent in response to the TCP ACK for the two packets from the UE. The TCP file download service is characterized in that downlink data increases with a certain time spacing between transmissions.

Considering this tendency, it is preferable to gradually increase the length of an active period for the UE in the service.

Besides the file download service, unpredictability and discontinuity in data generation are characteristics of packet services. Thus, a packet service may face different traffic generation status in every DRX cycle. Accordingly, the exemplary embodiments of the present invention are intended to provide a method for setting a DRX cycle that varies according to the amount of packet data in the UE.

Figure 1:
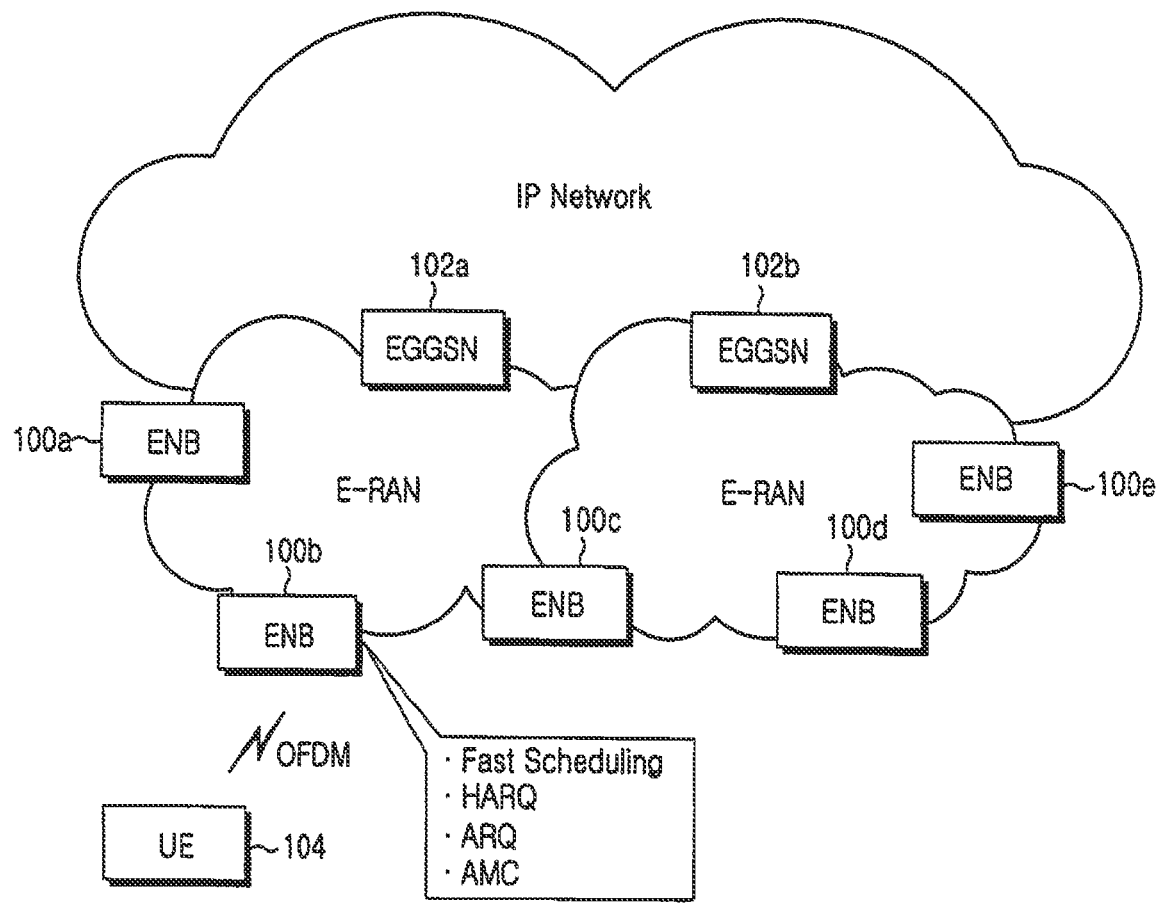
FIG. 1 illustrates the configuration of an LTE system to which the present invention applies.
Figure 2:
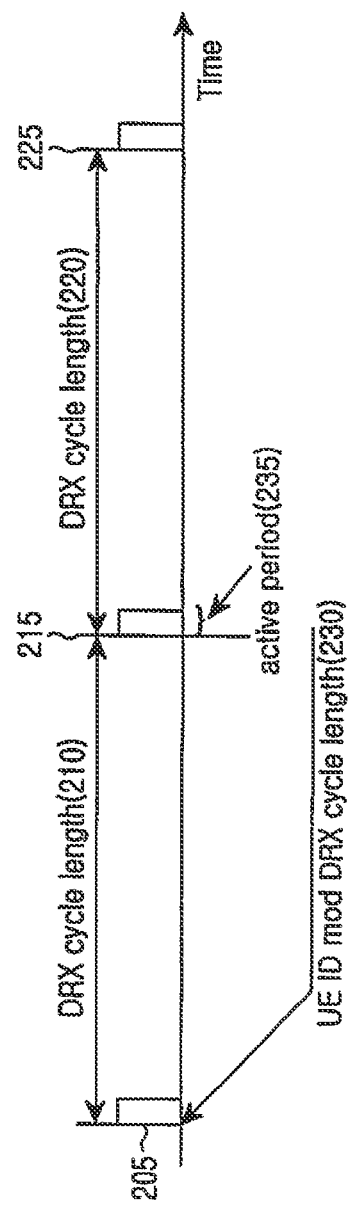
FIG. 2 illustrates the timing of DRX operation in a conventional mobile communication system.
Figure 3:
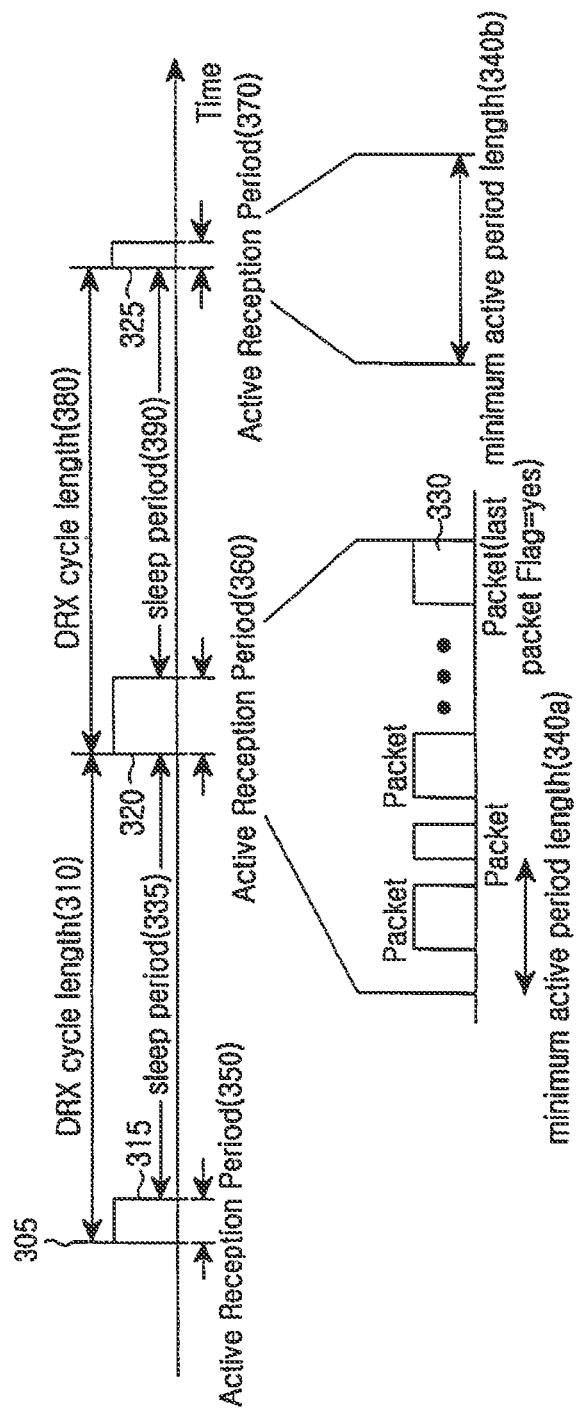
FIG. 3 illustrates a DRX operation with a variable active period length according to the present invention.

Referring to FIG. 3, a Node B signals a DRX cycle length 310, information for deriving the starting position 305 of an active period 350 (hereinafter, referred to as starting position deriving information), and a minimum active period length 340a or 340b.

The UE wakes up at each of the starting positions 305, 320 and 325 of active periods 350, 360 and 370. In the absence of data to receive, the UE is kept for the minimum active period length and enters into a sleep mode. In the presence of data to receive, the UE maintains the active period until receiving the data completely and then enters into the sleep mode.

The UE calculates the starting position 305 of the active period 350 in a predetermined method, for example, by modulo operation of the ID of the UE and the DRX cycle length. When the active period starts at time 305, the UE is activated.

The lengths of active periods 350, 360 and 370 range from the minimum length 340a or 340b to the DRX cycle length 310 or 380. At the starting position 305 of the active period 350, the UE receives a packet on a downlink channel. Reference numerals 340a and 340b denote identical minimum active period length.

As to the active period 360, packets are successively received for the minimum active period length 340a. The UE can terminate the active period 360 by determining if each received packet is the last one in a predetermined method.

The packet reception can be carried out in a predetermined method depending on the communication system. For example, in the LTE system, the UE monitors the downlink control channel to determine where there is a packet to receive and in the presence of a packet to receive, it receives the packet.

As to the active period 370, the UE wakes up at time 325 and finds out that there is no packet to receive during the predetermined minimum active period length 340b. Thus, the UE terminates the active period 370 and transitions to the sleep mode until the next active period comes.

On the other hand, when the UE wakes up at time 320 and determines the presence of a packet to receive before the minimum active period length 360 expires, it starts to receive packets from the Node B.

The end positions of active periods 350, 360 and 370 are signaled by in-band information included in a packet or by a control channel. Or the UE can autonomously determine the end positions of active periods 350, 360 and 370 in accordance with a predetermined rule.

1. In the case where the end of an active period is notified by in-band information, the Node B sets a 1-bit Last Packet Flag to YES in the last packet during the active period. Upon receipt of the packet with the Last Packet Flag set to YES, the UE maintains the active period until packets stored in an HARQ processor at the time when the UE detects that the packet is the last one are completely processed and when the processing is completed, the UE enters into the sleep mode.

2. When the end of an active period is notified by a control channel, the UE maintains the active period until packets under processing in the HARQ processor at the time when the termination of the active period is declared are received and when the reception is completed, the UE transitions to the sleep mode.

3. If no packets are received for a predetermined time period, the UE can transition to the sleep mode, considering that the active period has been terminated.

As described above, in the absence of any packet to receive, the active period is kept for the minimum active period length. In the presence of any packet to receive, the end of the active period is signaled by in-band information or an out-band signal in the control channel, or the end of the active period is determined autonomously by the UE. In this way, the active period is adjusted to a variable length, when needed, thereby ensuring an efficient DRX operation.

Embodiment 1

Figure 4:
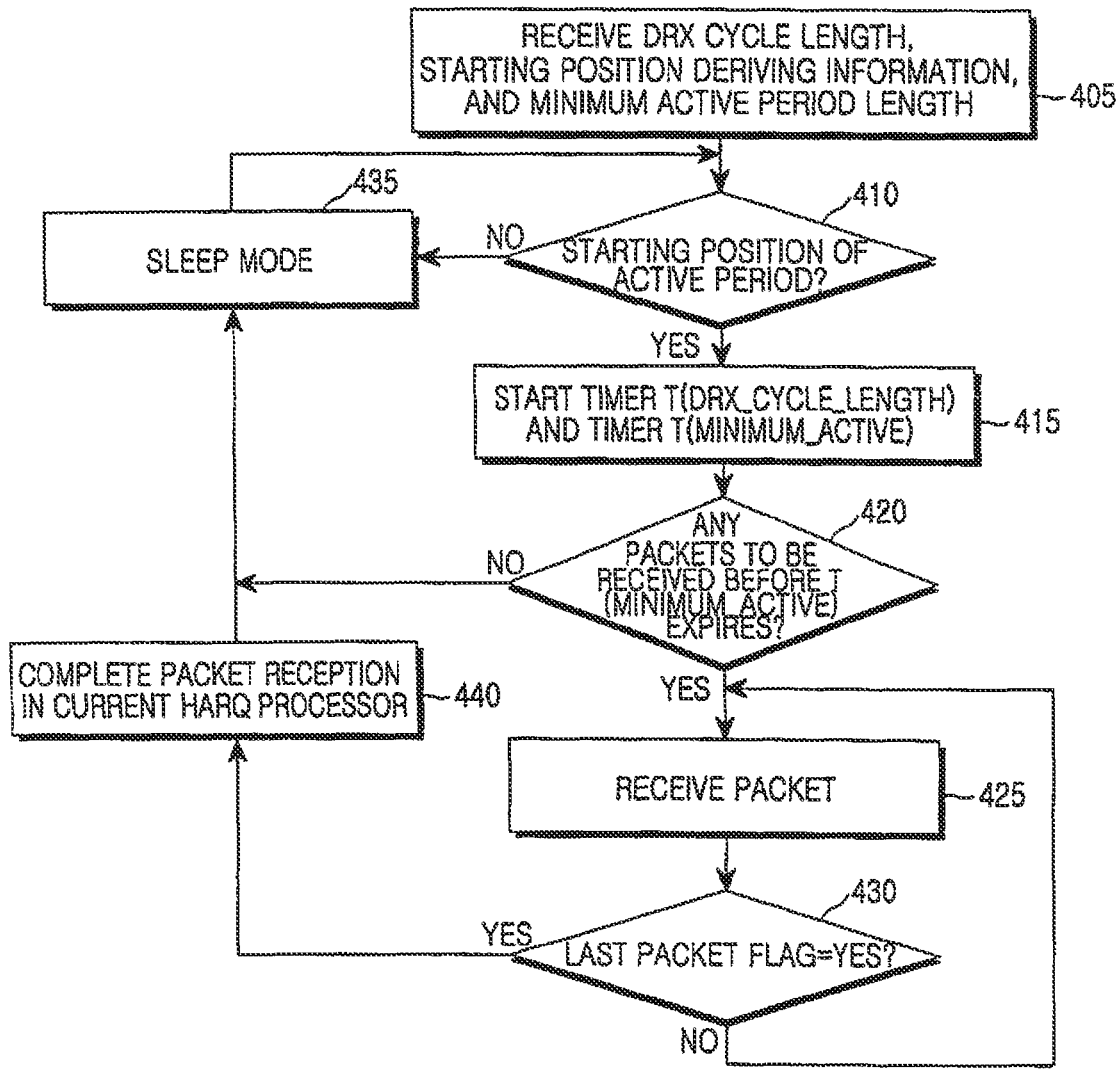
FIG. 4 is a flowchart of an operation of a UE in case of in-band signaling of the end of an active period according to the present invention.

Referring to FIG. 4, when the end of an active period is notified by the Last Packet Flag, the UE operates in the following way.

The UE receives information about a DRX cycle length, starting position deriving information, and a minimum active period length during a call setup in step 405. Then the UE prepares for a DRX operation.

In step 410, the UE derives the starting position of an active period from the starting position retrieved information, for example, an ID of the UE and the DRX cycle length and determines if the starting position of the active period has come.

If the active period has not started yet, the UE is kept in the sleep period until the starting position of the active period in step 435. The UE is aware that the active period starts the DRX cycle length after the starting position of the previous active period.

When the active period starts, the UE activates a timer T(DRX_CYCLE_LENGTH) and a timer T(MINIMUM_ACTIVE) in step 415. The timer T(DRX_CYCLE_LENGTH) is a timer set to the DRX cycle length T(DRX_CYCLE_LENGTH) and the timer T(MINIMUM_ACTIVE) is a timer set to the minimum active period length T(MINIMUM_ACTIVE).

In step 420, the UE monitors the shared control channel to determine if there is a packet to receive. If no packets to receive exist until the timer T(MINIMUM_ACTIVE) expires, the UE is placed in the sleep mode until the next active period starts in step 435. The next active period starts when the timer T(DRX_CYCLE_LENGTH) expires.

Conversely, if there is any packet to receive before the timer T(MINIMUM_ACTIVE) expires in step 420, the UE receives the packet according to an HARQ operation in step 425. If the packet is successfully received, the UE checks the Last Packet Flag of the received packet in step 430.

If the Last Packet Flag is set to YES, the UE goes to step 440. If the Last Packet Flag is set to NO, the UE returns to step 425 to continue the packet reception.

In step 440, the UE completes processing of HARQ packets stored in the HARQ processor when it finds out that the received packet is the last one. Then the UE enters into the sleep mode until the next active period starts. The next active period starts when the timer T(DRX_CYCLE_LENGTH) expires.

The completion of processing of HARQ packets means that a packet stored in the HARQ processor is normally received by the HARQ operation and thus an HARQ ACK is sent for the packet, or despite errors in the packet, a new packet is received in the same HARQ process and thus the reception of the packet is eventually failed in the HARQ operation.

That is, when a packet stored in the HARQ processor is successfully received or the UE determines that the successful reception of the packet is not possible, it is said that the packet is completely processed.

Embodiment 2

Figure 5:
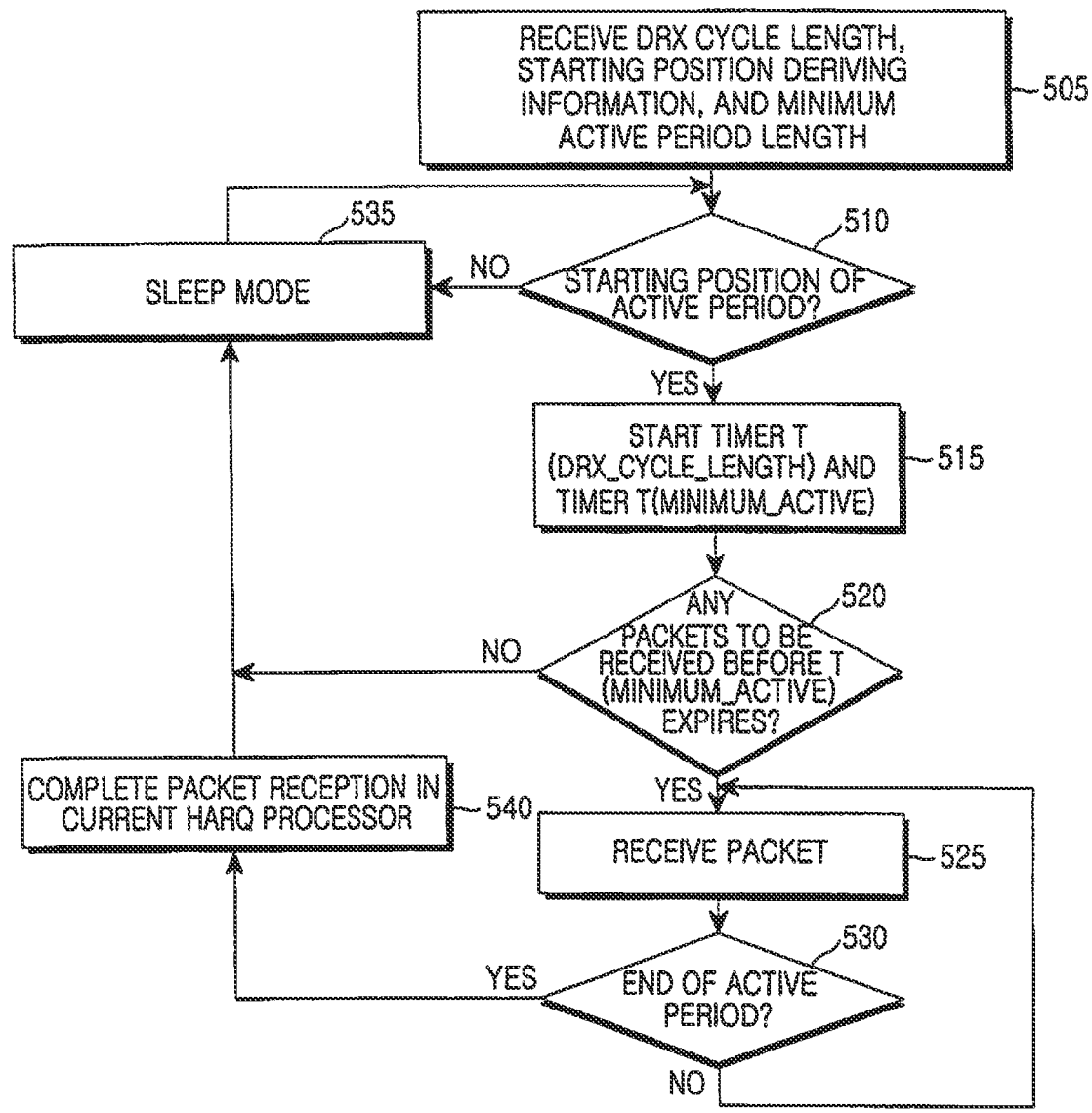
FIG. 5 is a flowchart of an operation of the UE in case of out-band signaling of the end of an active period according to the present invention.

Referring to FIG. 5, the UE operates in the same manner as in the first exemplary embodiment of the present invention, except for the way the UE determines the termination of an active period. Hence, the following description is made on different steps from those illustrated in FIG. 4. That is, steps 505 to 520 of FIG. 5 will not be described since they are performed in the same manner as steps 405 to 420 of FIG. 4.

In step 525, the UE receives a packet from the Node B according to a predetermined HARQ protocol.

As the UE continues receiving the downlink control channel, it monitors reception of a signal indicating the end of the active period on the downlink control channel in step 530.

Upon receipt of the signal, the UE proceeds to step 540 and otherwise, the UE returns to step 525 to continue the packet reception.

The UE completes processing of the HARQ packets, which exist in the HARQ processor at the time when it receives the signal indicating the end of the active period in step 540 and enters into the sleep mode until the next active period starts in step 535. The next active period starts when the timer T(DRX_CYCLE_LENGTH) activated in step 515 expires.

Embodiment 3

Figure 6:
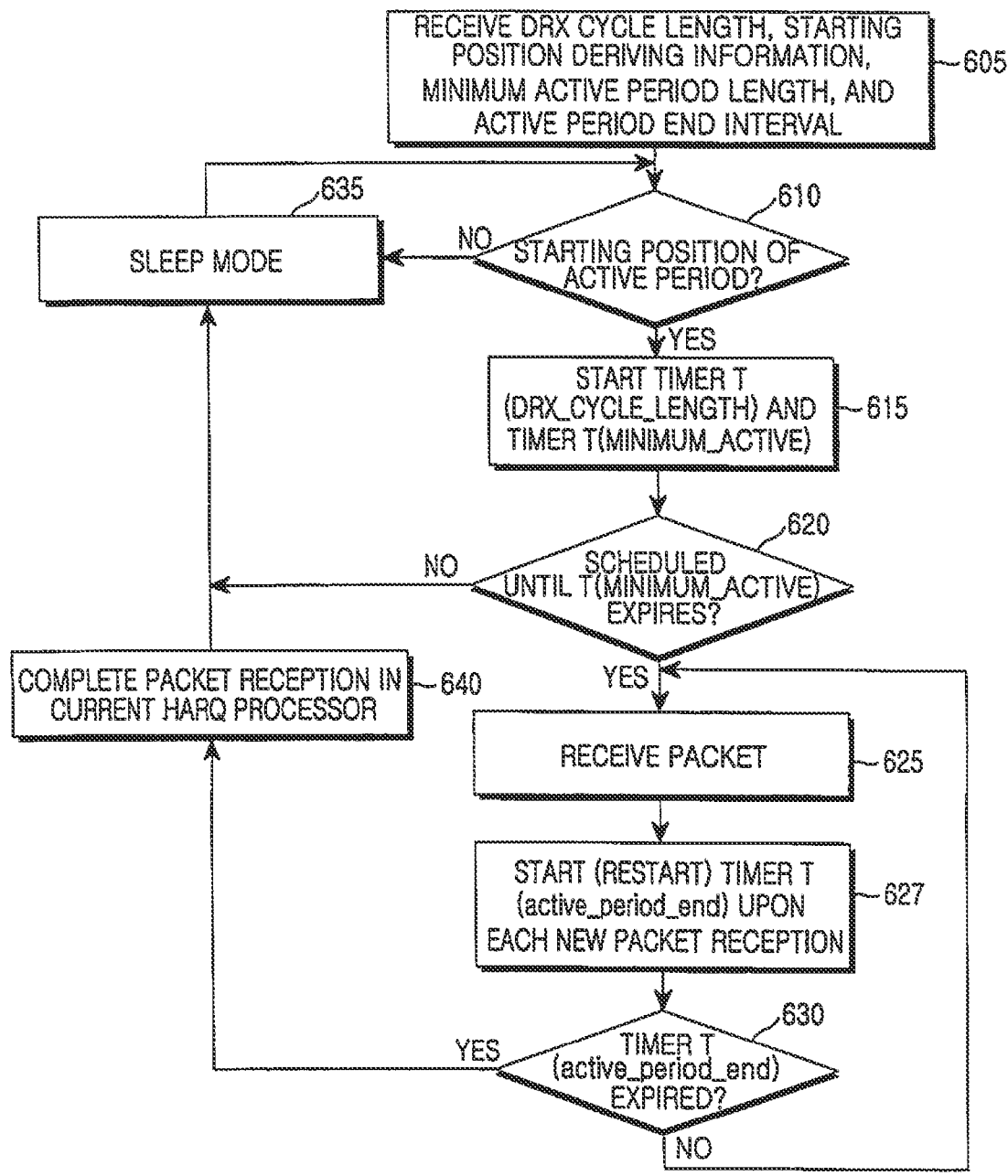
FIG. 6 is a flowchart of an operation of the UE when the MS determines the end of an active period, taking into account downlink activity according to the present invention.

Referring to FIG. 6, the UE receives information about a DRX cycle length, starting position deriving information, a minimum active period length, and an active period end interval during a call setup in step 605. Then the UE prepares for a DRX operation. The minimum active period length may be equal to the end of the active period interval. In this case, only one of both can be signaled. Then the UE prepares for a DRX operation.

In step 610, the UE derives the starting position of an active period from the starting position retrieved information, for example, an ID of the UE and the DRX cycle length and determines whether the starting position of the active period has come.

If the active period has not started yet, the UE is kept in the sleep period until the starting position of the active period in step 635. The start position of the active period is derived from the starting position retrieved information, and the next active period starts the DRX cycle length after the starting position of the previous active period.

When the active period starts, the UE activates a timer T(DRX_CYCLE_LENGTH) and another timer T(MINIMUM_ACTIVE) in step 615. Timer T(DRX_CYCLE_LENGTH) is a timer set to the DRX cycle length T(DRX_CYCLE_LENGTH) and timer T(MINIMUM_ACTIVE) is a timer set to the minimum active period length T(MINIMUM_ACTIVE).

In step 620, the UE monitors a shared control channel to determine if there is a packet to receive. If no packets to receive exist until the timer T(MINIMUM_ACTIVE) expires, the UE is placed in the sleep mode until the next active period starts in step 635. The next active period starts when the timer T(DRX_CYCLE_LENGTH) expires.

Conversely, if there is any packet to receive before the timer T(MINIMUM_ACTIVE) expires in step 620, the UE receives the packet according to the HARQ protocol in step 625.

In step 627, the UE starts (or restarts) a timer T(active_period_end) set to the active period end interval T(active_period_end). The timer T(active_period_end) is used to terminate the active period, unless a packet is received for the time T(active_period_end). The UE starts the timer T(active_period_end) upon receipt of the initial packet and restarts it each time the UE receives a following packet.

The following packet can be (1) a new packet or (2) either of a new packet or a retransmission packet.

That is, the UE can restart the timer T(active_period_end) only when the following packet is a new packet, or when the following packet is either of the new packet or a retransmission packet. For the sake of convenience, the former case is called method 1 and the latter is method 2.

In step 630, the UE determines if the timer T(active_period_end) has expired, that is, whether no packet has been received during the time T(active_period_end). If the timer T(active_period_end) has expired, the UE goes to step 640. If the timer T(active_period_end) is still running, the UE repeats steps 625 and 627.

In step 640, the UE operates in a different manner depending on method 1 or method 2.

In method 1, the UE completes processing of HARQ packets stored in the HARQ processor, upon time-out in step 640 and enters into the sleep mode until the next active period starts. The next active period starts when the timer T(DRX_CYCLE_LENGTH) expires.

In method 2, the UE enters into the sleep mode without waiting for the completion of processing of the HARQ packets because the end of the active period interval is set with regard to reception of any downlink packet irrespective of a new packet or a retransmission packet. If Node B does not retransmit a particular packet within the end of the active period interval, the UE switches to the sleep mode. Therefore, the Node B and the UE should send and receive the retransmission version of the packet during the active period end interval.

In other words, if a retransmission packet does not arrive at the UE within the end of the active period interval, this implies that the Node B has given up transmission of the packet and thus it is impossible for the UE to receive the packet successfully. Hence, the UE deletes packets stored in the HARQ processor of which the retransmission versions have not been received and immediately enters the sleep mode.

Figure 7:
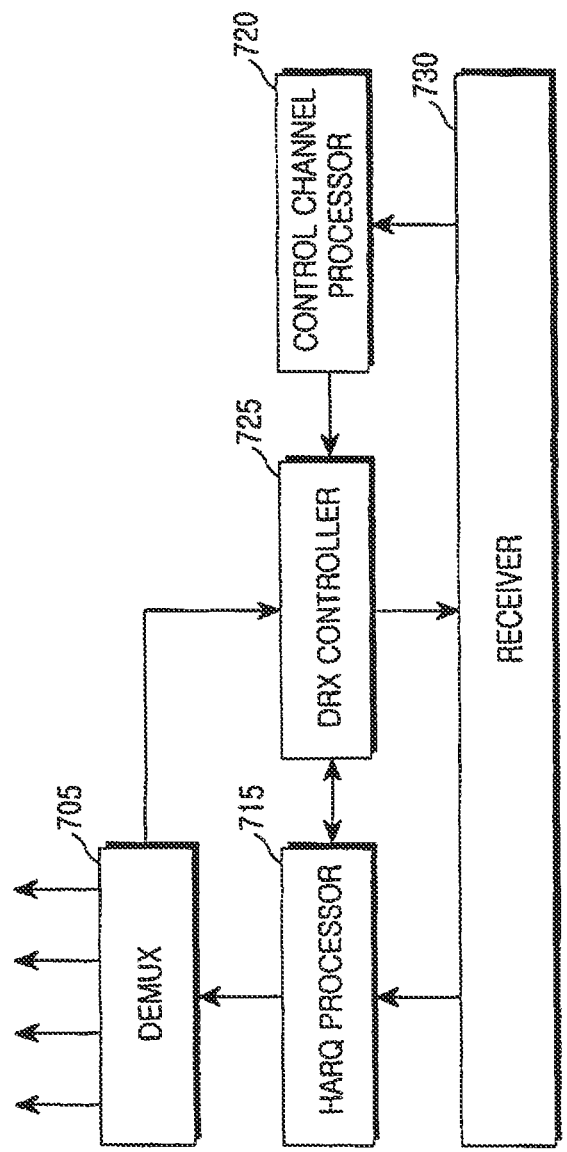
FIG. 7 is a block diagram of a UE receiver according to the present invention.

Referring to FIG. 7, a UE receiver 700 includes a Demultiplexer (DEMUX) 705, an HARQ processor 715, a control channel processor 720, a DRX controller 725, and a receiver 730.

Receiver 730 is turned on or off under the control of DRX controller 725. DRX controller 725 turns off the receiver in the sleep mode and turns it on in an active period. HARQ processor 715 processes an HARQ packet received from receiver 730 according to a predetermined HARQ operation, and provides an error-free HARQ packet to DEMUX 705.

DEMUX 705 checks the Last Packet Flag of the received HARQ packet. If the Last Packet Flag is set to YES, DEMUX 705 reports it to DRX controller 725 and also provides the received packet to a higher layer.

Upon sensing the reception of the packet with the Lat Packet Flag set to YES, DRX controller 725 monitors the status of HARQ processor 715. When processing of HARQ processor 715 is completed, DRX controller 725 enters the sleep mode, that is, turns off receiver 730.

Control channel processor 720 processes information received on a downlink shared control channel. If the end of the active period is signaled by the downlink shared control channel as with the second exemplary embodiment of the present invention described with reference to FIG. 5, control channel processor 720 reports the end of the active period to DRX controller 725.

Then, DRX controller 725 monitors the status of HARQ processor 715. When processing of HARQ processor 715 is completed, DRX controller 725 enters the sleep mode, that is, turns off receiver 730.

When UE receiver 700 receives the last packet as in the first exemplary embodiment of the present invention, preferably but not necessarily, it enters into the sleep mode after sending an RLC-level ACK signal (an RLC ACK signal, for short) rather than immediately entering into the sleep mode.

This is because in a packet service, the UE operates in an RLC Acknowledge Mode (RLC AM) using an Automatic Repeat reQuest (ARQ) different from the HARQ in order to increase the reliability of transmission/reception.

In an ARQ operation, a transmitter inserts a serial number into a packet prior to transmission and a receiver determines if there is any failed packet by checking the serial number. For the failed packet, the receiver requests a retransmission of the failed packet by sending a Negative ACK (NACK) signal to the transmitter. For a successfully received packet, the receiver sends an ACK signal to the transmitter. The ACK signal and the NACK signal are carried in a control message called an RLC status report.

If a service requiring DRX is provided in the RLC AM, upon receipt of the last packet, the UE must send an RCL ACK signal for the last packet. Therefore, the UE preferably enters into the sleep mode after sending the RLC ACK signal rather than immediately entering into the sleep mode.

Thus, a description will be made of a method for, upon receipt of a packet piggybacked with a last packet indicator, entering into the sleep mode after sending an RLC ACK signal for the last packet, compared to the first exemplary embodiment of the present invention.

The UE operates in an active period with no packets to receive in the same manner as in the first exemplary embodiment of the present invention and thus a description of the UE operation in the active period with no packets to receive is not provided herein.

Figure 8:
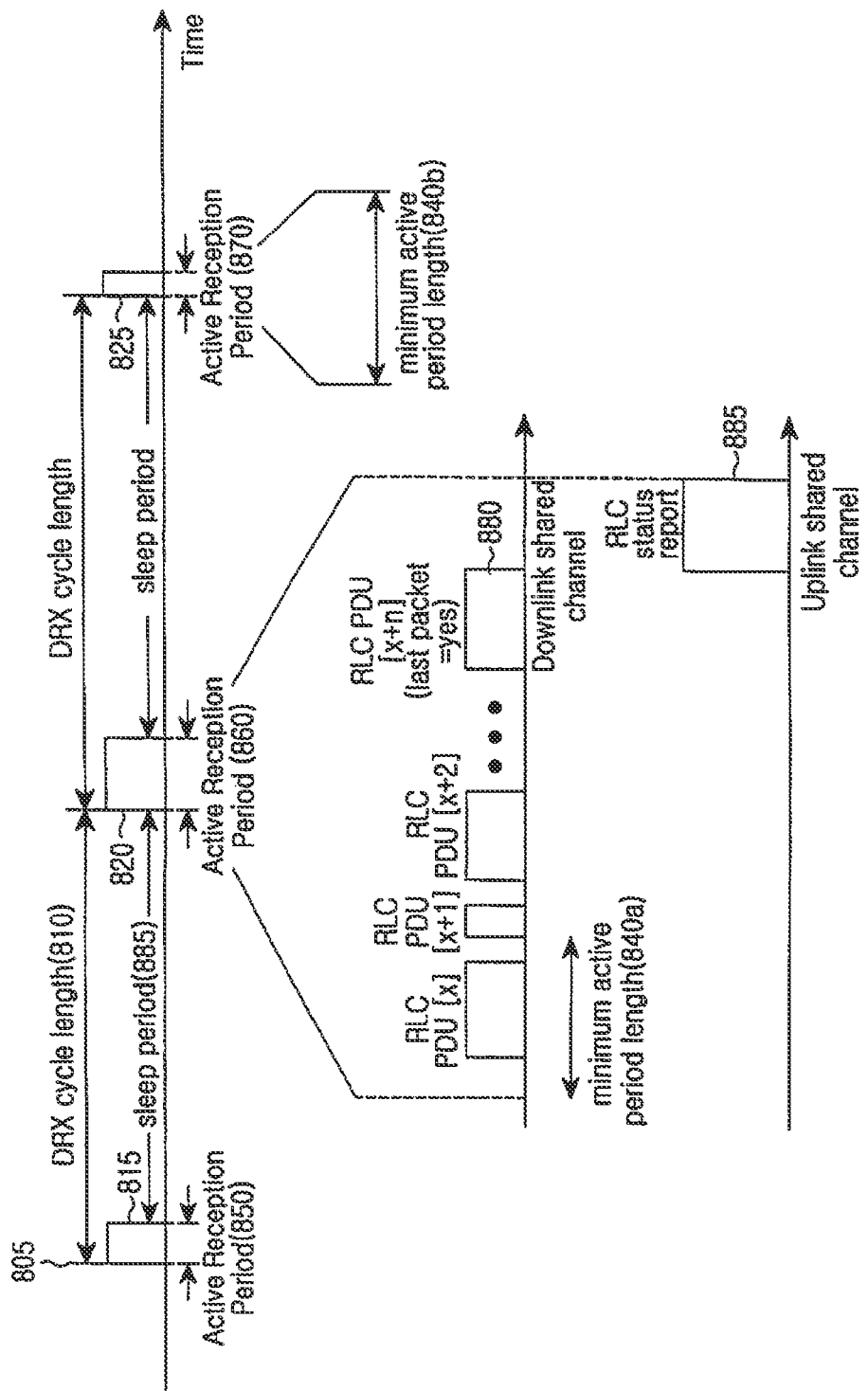
FIG. 8 illustrates the timing of DRX operation considering an RLC ACKnowledgement (ACK) signal according to the present invention.

Referring to FIG. 8, the Node B signals a DRX cycle length 810, information for deriving the start position 805 of an active period 850, and a minimum active period length 840a or 840b.

The UE wakes up at each of the starting positions 805, 820 and 825 of active periods 850, 860 and 870. In the absence of data to receive, the UE is kept for the minimum active period length and enters into the sleep mode. In the presence of data to receive, the UE maintains the active period until receiving the data completely and then enters into the sleep mode.

The UE calculates the starting position 805 of the active period 850 according to a predetermined method, for example, by modulo operation of an ID of the UE and the DRX cycle length. When the active period starts at the time point 305, the UE is activated.

The lengths of the active periods 850, 860 and 870 variably range from the minimum length 840a or 840b to the DRX cycle length 810 or 880. At the starting position 805 of the active period 850, the UE receives a packet on a downlink channel. Reference numerals 840a and 840b denote a physically identical minimum active period length.

As to the active period 860, packets are successively received for the minimum active period length 840a. The UE can terminate the active period 860 by determining whether each received packet is the last one.

For example, the UE wakes up at the start position of an active period and monitors a downlink control channel. That is, the downlink control channel and downlink packets are sent to the UE before the minimum active period length 840a ends. The UE receives the downlink packets until receiving a packet 880 piggybacked with a last packet indicator. The last packet indicator can take the form of an RLC control signal.

The UE operates differently in an active period with packets to receive in the first and fourth exemplary embodiments of the present invention, as follows.

When the UE completely receives a packet piggybacked with a Last Packet Flag set to YES, it terminates the active period and transitions to the sleep mode in the first exemplary embodiment of the present invention.

In the fourth exemplary embodiment of the present invention, when the UE receives a packet piggybacked with a last packet indicator and completes successful reception of all packets with lower serial numbers than that of the last packet, it sends ACK signals for the packets with the lower serial numbers, ends the active period, and then enters into the sleep mode.

Let the serial numbers of the packets be denoted by x to x+n, an RLC entity 945 configured for each application in the UE determines if any RLC PDU has not been received by checking the serial numbers of received RLC Packet Data Units (PDUs). Upon receipt of a packet with a last packet indicator, the UE sends an RLS status report 885 with reception status information about the RLC PDUs on an uplink channel.

If all the RLC PDUs, RLC PDU [x] to RLC PDU [x+n] have been received, the RLC status report 885 carries ACK signals for the RLC PDUs. After sending the RLS status report 885, the UE terminates the active period.

On the other hand, if RLC PDU [x+m] from among RLC PDU [x] to RLC PDU [x+n] has not been received, the UE includes a NACK signal for the failed RLC PDU in the RLC status report 885. Then the UE maintains the active period until the failed RLC PDU is completely retransmitted from Node B.

Figure 9:
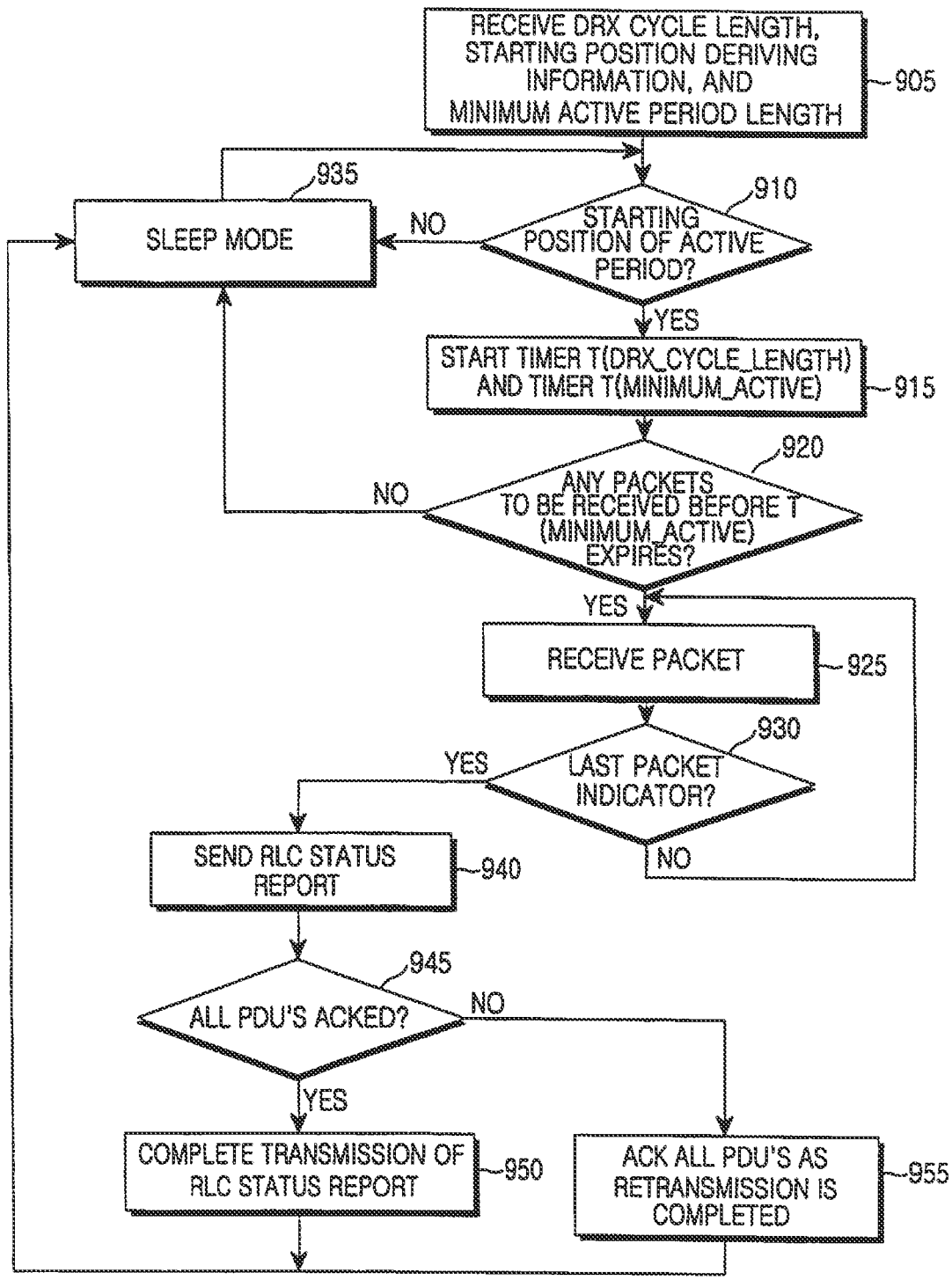
FIG. 9 is a flowchart of the DRX operation considering an RLC ACK signal in the UE according to the present invention.

Referring to FIG. 9, the UE receives information about a DRX cycle length, starting position deriving information, and a minimum active period length during a call setup in step 905. Then the UE prepares for a DRX operation.

In step 910, the UE derives the starting position of an active period from the starting position deriving information, for example, the ID of the UE and the DRX cycle length and determines if the starting position of the active period has come.

If the active period has not started yet, the UE is kept in a sleep period until the starting position of the active period in step 935. The next active period starts the DRX cycle length after the starting position of the active period.

When the active period starts, the UE activates a timer T(DRX_CYCLE_LENGTH) and another timer T(MINIMUM_ACTIVE) in step 915. The timer T(DRX_CYCLE_LENGTH) is a timer set to the DRX cycle length T(DRX_CYCLE_LENGTH) and the timer T(MINIMU- M_ACTIVE) is a timer set to the minimum active period length T(MINIMUM_ACTIVE).

In step 920, the UE monitors a shared control channel to determine if there is a packet to receive. If no packets to receive exist until the timer T(MINIMUM_ACTIVE) expires, the UE is placed in the sleep mode until the next active period starts in step 935. The next active period starts when the timer T(DRX_CYCLE_LENGTH) expires.

Conversely, if there is any packet to receive before the timer T(MINIMUM_ACTIVE) expires in step 920, the UE receives the packet according to an HARQ operation in step 925.

If the packet is successfully received, the UE determines if the received packet is the last one by, for example, checking control information piggybacked in the packet in step 1030. When sending the last RLC PDU, the RLC transmitter includes control information indicating the last RLC PDU in the RLC PDU. Thus, the UE determines the presence or absence of the control information indicating the last RLC PDU in the received RLC PDU in step 1030.

If the received packet is not the last one, the UE continues the packet reception until receiving a packet with control information indicating the last packet in step 925.

If the received packet is the last one, the UE constructs an RLC status report representing the reception statuses of RLC PDUs received so far in step 940. The RLC status report contains the RLC serial numbers of failed packets and the RLC serial numbers of received packets. As stated before, the former RLC serial numbers are called NACKs and the latter RLC serial numbers are called ACKs. Hence, the RLC status report includes the NACKs and the ACKs. The NACKs are a set of the serial numbers of the failed packets and the ACKs are a set of the serial numbers of the received packets.

In the absence of any NACK in the RLC status report, the UE checks if the RLC status report includes an ACK for the last RLC PDU and ACKs for all other RLC PDUs with lower serial numbers that of the last RLC PDU in step 945. If the check result is YES, the UE goes to step 950. If the check result is NO, which implies that there is a packet requiring retransmission, the UE goes to step 955.

The UE sends the RLC status report in step 950 and enters into the sleep mode until the next active period starts in step 935. The next active period starts when the timer T(DRX_CYCLE_LENGTH) expires.

In step 955, the UE sends the RLC status report and waits until retransmissions of RLC packets requiring retransmission in the RLC status report are completed. Then, the UE sends an RLC status report with ACKs for all RLC PDUs with the lower serial numbers than that of the last RLC PDU. The UE enters into the sleep mode until the next active period starts in step 935.

Figure 10:
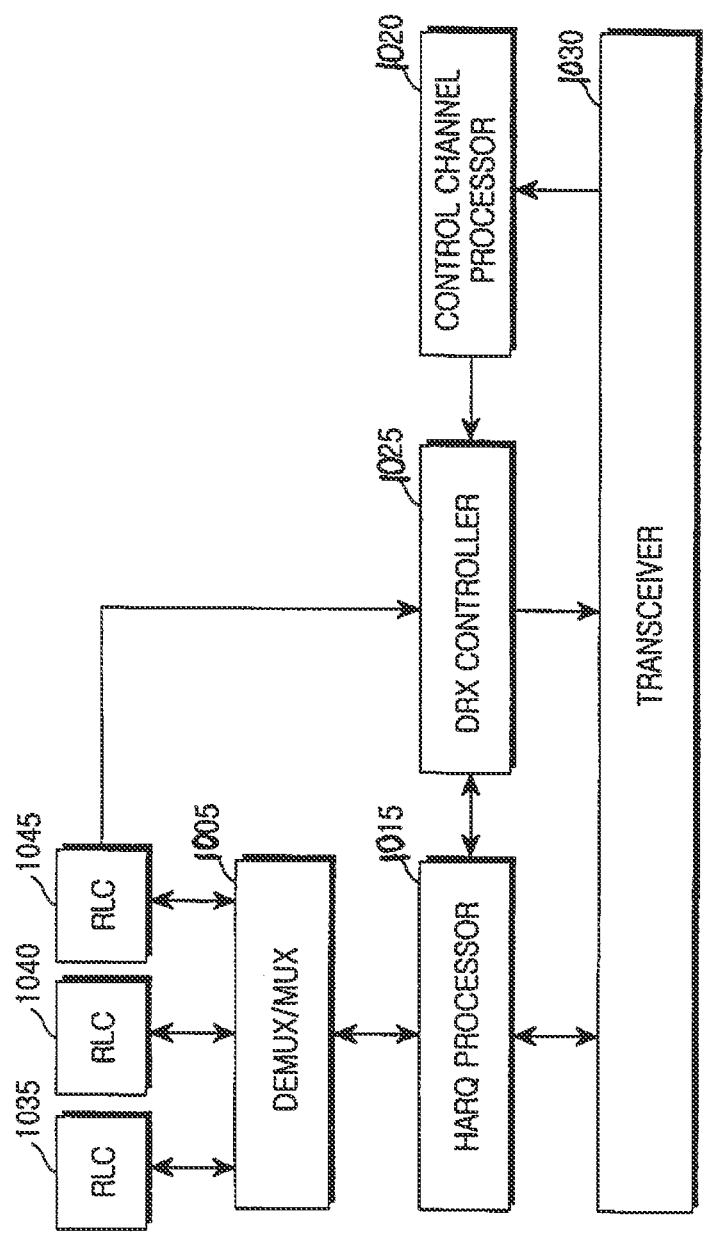
FIG. 10 is a block diagram of a UE receiver according to the present invention.

Referring to FIG. 10, the UE receiver may have a plurality of RLC entities 1035, 1040, and 1045 configured for respective applications. Some of them may be configured to operate in a DRX mode. For example, RLC entity 1045 operates in the DRX mode.

When the following conditions are all satisfied, RLC entity 1045 requests a DRX controller 1025 to terminate the active period.

Condition 1: an RLC PDU piggybacked with a last packet indicator is received.

Condition 2: all packets received during the active period are successfully received.

Condition 3: an RLC status report with ACKs for all packets received during the active period is completely sent.

Also, RLC entity 1045 determines if there is any failed packet by checking the serial numbers of the RLC PDUs and constructs the RLC status report according to the determination result.

Upon receipt of a signal indicating the end of the active period from RLC entity 1045 operating in the DRX mode, DRX controller 1025 terminates the active period and maintains the sleep mode until the next active period starts.

A DEMultiplexer/Multiplexer (DEMUX/MUX) 1005 multiplexes RLC PDUs received from the RLC layer, i.e. RLC entities 1035, 1040 and 1045 into a MAC PDU, or demultiplexes a MAC PDU received from an HARQ processor 1015 into RLC PDUS prior to transmission to RLC entities 1035, 1040 and 1045.

HARQ processor 1015 processes an HARQ packet received from a transceiver 1030 according to a predetermined HARQ operation and provides an error-free HARQ packet to DEMUX/MUX 1005. DEMUX of DEMUX/MUX 1005 provides the received HARQ packet to RLC layer 1035, 1040, and 1045.

Also, HARQ processor 1015 provides a MAC PDU received form the DEMUX of the DEMUX/MUX 1005 to the transceiver according to the HARQ operation and the transceiver 1030 sends the MAC PDU to the Node B.

A control channel processor 1020 processes information received form a downlink shared control channel. If the information indicates the presence of a packet destined for the UE, control channel processor 1020 reports the presence of a packet to receive to DRX controller 1025.

DRX controller 1025 finds out the start position of an active period and turns on a receiver at the start position. If DRX controller 1025 does not receive the report indicating the presence of a packet to receive from control channel processor 1020 until a minimum active period length expires, it terminates the active period.

On the other hand, upon receipt of the report indicating the presence of a packet to receive, DRX controller 1025 maintains the active period until it receives a signal indicating the end of the active period from RLC entity 1045.

As is apparent from the above description, the present invention increases a UE waiting time by defining a DRX operation for a connected UE considering service characteristics in a future-generation mobile communication system. Therefore, the power consumption of the UE is minimized.

For a packet service in which traffic generation status may vary every DRX cycle, adjusting an active period length according to the requirements of traffic at a reception time provides a DRX operation.

Also, the UE enters into a sleep mode after confirming successful reception of packets including retransmission packets and sending an RLC ACK signal for the packets. Therefore, the reception performance of the packets is increased.

While the invention has been shown and described with reference to certain exemplary embodiments thereof, it will be understood by those skilled in the art that various changes in form and details may be made therein without departing from the spirit and scope of the present invention as further defined by the appended claims and their equivalents.

What is claimed is:

1. A method for controlling an active period during a discontinuous reception (DRX) operation in a user equipment (UE) in a mobile communication system, the method comprising: receiving configuration information about a DRX cycle length, a starting position of an active period, a first timer, and a second timer; identifying the starting position of the active period by using the configuration information; starting the first timer when the active period starts; monitoring a control channel while the first timer is running; identifying whether there is a new downlink packet transmission indicated by the control channel; starting or restarting the second timer after identifying the indication of the new downlink packet transmission; determining an end of the active period in case that the second timer has expired; and entering a sleep state based on the end of the active period.

2. The method of claim 1, wherein the UE awakes at the starting position of the active period.

3. The method of claim 1, wherein the first timer monitors a control signal on the control channel, the control signal being associated with a downlink packet to be transmitted.

4. The method of claim 3, wherein the control signal is received from a Node B.

5. The method of claim 3, further comprising processing a hybrid automatic repeat request (HARQ) packet stored in a HARQ processor of the UE, and entering the sleep state until a next DRX cycle starts, when the new downlink packet is different from the downlink packet.

6. The method of claim 3, further comprising entering the sleep state without completion of processing of a hybrid automatic repeat request (HARQ) packet stored in a HARQ processor of the UE, when the new downlink packet is a retransmission of the downlink packet.

7. The method of claim 1, further comprising terminating the active period in case that the UE receives a control signal indicating that the active period should be terminated.

8. The method of claim 1, further comprising monitoring a downlink control channel during the active period.

9. The method of claim 1, wherein the UE restarts the second timer when there is a downlink packet to receive while the second timer is running.

10. The method of claim 1, further comprising switching to the sleep state until the DRX cycle length is over.

11. An apparatus for controlling an active period during a discontinuous reception (DRX) operation in a user equipment (UE) in a mobile communication system, the apparatus comprising:
a transceiver; and
a processor configured to:
receive, through the transceiver, configuration information about a DRX cycle length, a starting position of an active period, a first timer, and a second timer,
identify the starting point of the active period by using the configuration information,
start the first timer when the active period starts,
monitor a control channel while the first timer is running,
identify whether there is a new downlink packet transmission indicated by the control channel,
start or restart the second timer after identifying the indication of the new downlink packet transmission,
determine an end of the active period in case that the second timer has expired, and
enter a sleep state based on the end of the active period.

12. The apparatus of claim 11, wherein the UE awakes at the starting position of the active period.

13. The apparatus of claim 11, wherein the first timer monitors a control signal on the control channel, the control signal being associated with a downlink packet to be transmitted.

14. The apparatus of claim 13, wherein the control signal is received from a Node B.

15. The apparatus of claim 13, wherein the processor is further configured to, when the new downlink packet is different from the downlink packet, process a hybrid automatic repeat request (HARQ) packet stored in a HARQ processor of the UE, and enter the sleep state until a next DRX cycle starts.

16. The apparatus of claim 13, wherein the processor is further configured to, when the new downlink packet is a retransmission of the downlink packet, enter the sleep state without completion of processing of a hybrid automatic repeat request (HARQ) packet stored in a HARQ processor of the UE.

17. The apparatus of claim 11, wherein the processor is further configured to terminate the active period in case that the UE receives, through the transceiver, a control signal indicating that the active period should be terminated.

18. The apparatus of claim 11, wherein the processor is further configured to monitor a downlink control channel during the active period.

19. The apparatus of claim 11, wherein the processor restarts the second timer when there is a downlink packet to receive while the second timer is running.

20. The apparatus of claim 11, wherein the processor is further configured to switch to the sleep state until the DRX cycle length is over.

* * * * *